(12) United States Patent
Song et al.

(10) Patent No.: US 10,252,501 B2
(45) Date of Patent: Apr. 9, 2019

(54) PVC FLOORING

(71) Applicant: ZHEJIANG YONGYU BAMBOO JOINT-STOCK CO., LTD., Zhejiang Province (CN)

(72) Inventors: Jiangang Song, Zhejiang Province (CN); Yongxing Chen, Zhejiang Province (CN); Fuqing Liu, Zhejiang Province (CN)

(73) Assignee: ZHEJIANG YONGYU BAMBOO JOINT-STOCK CO., LTD. (CN)

(*) Notice: Subject to any disclaimer, the term of this patent is extended or adjusted under 35 U.S.C. 154(b) by 51 days.

(21) Appl. No.: 15/492,871

(22) Filed: Apr. 20, 2017

(65) Prior Publication Data
US 2018/0304601 A1 Oct. 25, 2018

(51) Int. Cl.
B32B 7/02 (2006.01)
B32B 27/30 (2006.01)
B32B 7/12 (2006.01)
B32B 9/02 (2006.01)
B32B 21/04 (2006.01)
E04F 15/10 (2006.01)

(52) U.S. Cl.
CPC ............ B32B 27/304 (2013.01); B32B 7/02 (2013.01); B32B 7/12 (2013.01); B32B 9/02 (2013.01); B32B 21/04 (2013.01); E04F 15/107 (2013.01); B32B 2307/554 (2013.01); B32B 2471/00 (2013.01)

(58) Field of Classification Search
CPC .................................. B32B 27/02; B32B 7/02
See application file for complete search history.

(56) References Cited

U.S. PATENT DOCUMENTS

| 5,405,674 A * | 4/1995 | Wang ..................... B05D 7/54 428/158 |
| 8,519,053 B2 | 8/2013 | Tian et al. |
| 9,567,427 B2 | 4/2017 | Tian et al. |
| 2006/0204773 A1 | 9/2006 | Kwon |
| 2014/0360117 A1 | 12/2014 | Ko et al. |
| 2018/0111360 A1 | 4/2018 | Xiao |

FOREIGN PATENT DOCUMENTS

| AU | 2007305234 A1 | 4/2008 |
| CN | 205502490 U | 8/2016 |
| CN | 106499152 A | 3/2017 |
| CN | 206487116 U | 9/2017 |
| TW | 201702276 A | 1/2017 |
| WO | 2008042387 A2 | 4/2008 |
| WO | 2017003762 A1 | 1/2017 |

* cited by examiner

Primary Examiner — Lawrence D Ferguson
(74) Attorney, Agent, or Firm — Heslin Rothenberg Farley & Mesiti, P.C.; Victor Cardona

(57) ABSTRACT

A polyvinyl chloride (PVC) flooring, includes a wear-resistant layer, a decorative layer and a substrate layer from top to bottom in order, wherein the substrate layer comprises a flexible layer, a strength layer and a correction layer from top to bottom in order and the hardness of the strength layer is 1.05-1.10 times that of the flexible layer and the correction layer.

9 Claims, 3 Drawing Sheets

PVC FLOORING

BACKGROUND OF THE INVENTION

Technical Field

The present application relates to the field of a flooring technology, and more specifically, to an improved polyvinyl chloride (PVC) faced flooring and its manufacturing method.

Description of Related Art

The existing flooring usually consists of solid wood flooring, multi-layer composite flooring, laminated flooring, PVC flooring, and so on, each respectively having its own advantages and disadvantages. The PVC flooring has a variety of forms, such as wood faced PVC plastic flooring with tongue-and-grooves and its manufacturing method disclosed in Chinese Patent No. 201110182685.2, comprising a face layer and a PVC wood-plastic layer; the face layer is a composite layer consisting of a wear-resistant PVC face layer, a color film and a PVC back sheet; the PVC back sheet of the face layer is bonded to the PVC wood-plastic flooring layer. Conventional PVC flooring structure said before has the characteristics of good stability and mechanical strength. As a further improvement basis on the above structure, a four-roll calendaring production apparatus for the surface film of a PVC flooring disclosed in Chinese Patent No. 201610158937.0 provides a product comprising a PVC basic layer, a color film and a wear-resistant layer, these three layers bonded without any adhesive but only by way of hot pressing. However, the above-mentioned structure of the PVC flooring also has the shortcoming of being easy to bend and deform.

BRIEF SUMMARY OF THE INVENTION

The objective of the present invention is to overcome the shortcomings of the existing PVC flooring structures so that to provide a PVC flooring that has characteristics of good flatness retention and foot feeling.

To alleviate the above-mentioned problems, a novel PVC flooring was designed as comprising a wear-resistant layer, a decorative layer and a substrate layer from top to bottom in order, wherein said substrate layer comprises a flexible layer, a strength layer and a correction layer from top to bottom in order and the hardness of said strength layer is 1.05-1.10 times that of said flexible layer and the correction layer.

The PVC flooring earns higher flatness when the it was just manufactured, but the retention of the flatness lasts only a relatively short period; after a time span of storage, when installed, the product tends to bend and deform to some extent, thanks to the lower thickness of the PVC sheet that the installers can completed the paving by way of pressing with hard force and by means of a strong adhesive or a locking structure. However, the above-mentioned of tending to bend and deform affect the efficiency of flooring paving, meanwhile there are always a trend to bend and deform and a force coming from that trend inside the flooring, thus which making the installation reliability very poor and having problems such as locking failure and noise.

In the technical solution, the substrate layer comprised three sub-layers with different hardness (Rockwell hardness), wherein the two sub-layers (the flexible layer and the correction layer) with lower hardness were arranged separately in the upper layer and the lower layer, and the other sub-layer (the strength layer) was arranged in the middle layer. Such a structure obtains advantages as: firstly, the symmetrical arrangement of the two sub-layers with lower hardness on each side of the sub-layer with higher hardness make the substrate layer a symmetrical structure which is conductive to the stability. Secondly, the two sub-layers with lower hardness have better stability as well as the adaption of the stability, that is, they will not change their shape or will only scarcely change the shape while the ambient temperature and humidity changing; as a result that when the shape of the adjacent sub-layer of one sub-layer changing or tending to change, the said sub-layer limit and constrained the deformation of the said adjacent sub-layer by its stiffness, adjust to the deformation of the said adjacent sub-layer by its flexibility and further more counteract the force of the deformation. Finally, it is notable that the symmetrical structure and the structure of the sub-layers with lower hardness arranged on the outer sides may not achieve the effect of flatness, only when the ratio of the hardness of the two outer sub-layers to the hardness of the sub-layer of the core layer is 1:(1.05-1.10), can the equilibrium state be achieved. As a result, the flatness retention of the PVC flooring in the present invention is improved, so that after has been stored for a period of time, the product still maintain its designed shape at the time of installation, thus realize the a rapid and economical installation as well as avoiding the problems of locking failure or noise caused by the deformation or the tendency of deformation upon a long-term use of the product.

As an attached technical-effect, when the sub-layers with lower hardness are arranged on the outer sides, the flexibility of the PVC flooring in the present invention can be improved, which enhances the elasticity for a better foot feeling, thus making the experience of using the product similar to a wooden flooring.

In one embodiment, the thickness ratio of said flexible layer, said strength layer and said correction layer is 1:(1.8-2.2):1.

After long term studies, the inventors found that when the thickness ratio of the three sub-layers is 1:2:1, or is close to 1:2:1 which is known to those skilled in the art, the adaptability with the hardness ratio of the three sub-layers reaches the highest level.

In one embodiment, said flexible layer, said strength layer and said correction layer are immediately molded by way of co-extrusion.

In one embodiment, there is no adhesive between said flexible layer, said strength layer and said correction layer (between said flexible layer and said strength layer, and between said strength layer and said correction layer).

Because the thickness of each layer of PVC material is thin and the thickness of the sub-layers is even thinner, the glue films between these multiple sub-layers and the uniformity of the gluing of each film will affect the stability of the final product, and is hard to achieve the balance between the sub-layers.

In one embodiment, the weight ratio of the PVC powder and the calcium powder in the flexible layer is 1:(2-3), and the weight ratio of the PVC powder and the calcium powder in the strength layer and the correction layer is 1:(3-4) and 1:(2-3).

In one embodiment, raw materials of each layer and the feeding amount of each raw material are shown in the following table:

|  | Sublayer | | |
| --- | --- | --- | --- |
| Ingredients | Flexible Layer | Strength Layer | Correction Layer |
| Calcium powder | 267-300 kg | 300-320 kg | 267-300 kg |
| PVC powder | 100-133 kg | 80-100 kg | 100-133 kg |
| Calcium-zinc stabilizer | 7.8-8.2 kg | 6.8-7.2 kg | 7.8-8.2 kg |
| Aids acrylic resin (ACR) | 4.8-5.2 kg | 4.8-5.2 kg | 4.8-5.2 kg |
| Chlorinated polyethylene | 5.8-6.2 kg | 3.8-4.2 kg | 5.8-6.2 kg |
| AC3A.G60-1 stearic acid | 1 kg | 1.2 kg | 1 kg |

In the invention presented here, the adaptability of the flexible layer and the correction layer act in concert with the stability of the strength layer, so as to obtain an excellent property of shock resistance to ensure a mechanical properties when used as surface layers as well as the adaptability, or the flexibility, all upon the allocation of the above-mentioned raw materials and the feeding amount of each raw materials, and In one embodiment, said decorative layer comprises a color paper, and said wear-resistant layer comprises a PVC film and/or a paint layer overlaid on said PVC film, with no adhesive used between said wear-resistant layer and said decorative layer.

In an embodiment, said decorative layer comprises a wood-faced sheet or a bamboo-faced sheet, and said wear-resistant layer comprises a paint layer, and using adhesive to bond these two layers.

In an embodiment, said PVC flooring further comprises a mute layer which is provided below said substrate layer, and said mute layer selected from the group consisting of a cork layer, an IXPB layer, an ethyleno vinyl acetale (EVA) layer, and a PVC layer, and combinations thereof.

Preferably, the method of producing said PVC flooring comprises the steps of: firstly, obtaining materials A and B by way of extrusion, dividing said material A into two equal portions by using of a dispenser and placing said material B between the two portions of said material A; then forming said substrate layer with said materials A and B by means of hot-extruding with a pair of molds; and then using a backside pattern roller to form concave-convex backside patterns on the back surface of said substrate layer; and finally, using an embossing roller to hot-press and calender said wear-resistant layer and said corrective layer on the surface of the substrate layer and simultaneously forming concave-convex surface patterns.

In one embodiment, the method of producing said PVC flooring comprises the steps of: firstly, obtaining materials A and B by way of extrusion, dividing said material A into two equal portions by using of a dispenser and placing said material B between the two portions of said material A; then forming said substrate layer with said materials A and B by means of hot-extruding with a pair of molds; and then applying the glue on the surface of said substrate layer and using a hot press to calender the decorative layer; and finally, roll-coating the paint to form the wear-resistant layer.

To sum up, the PVC flooring in the technical solution has the characteristics of good flatness retention and foot feeling.

DETAILED DESCRIPTION OF THE INVENTION

The present invention is further detailed in combination with the drawings and preferred embodiments as follows.

Figure 1:
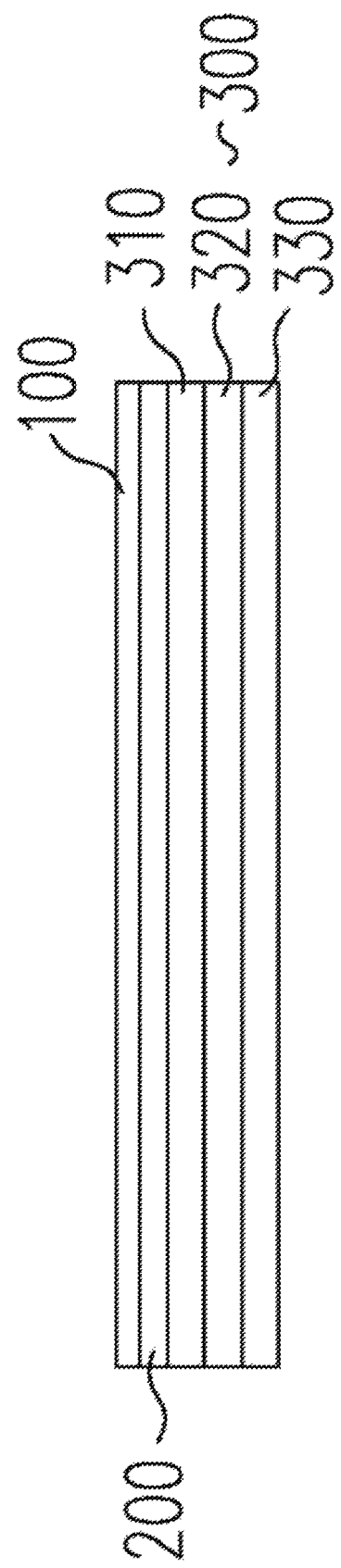
FIG. 1 is a diagram of the PVC flooring in one of the embodiments of the present invention.

According to one or more embodiments disclosed herein, referring to FIG. 1, a PVC flooring comprises a wear-resistant layer 100, a decorative layer 200 and a substrate layer 300 from top to bottom in order. The decorative layer 200 is a colored paper, the wear-resistant layer 100 comprises a PVC film and a paint layer overlaid on the PVC film, and the substrate layer 300 comprises three sub-layers, that is, a flexible layer 310, a strength layer 320 and a correction layer 330 from top to bottom in order, wherein the thickness of the flexible layer 310 is 1 mm, the thickness of the strength layer 320 is 2 mm and the thickness of the correction layer 330 is 1 mm. In this embodiment, the hardness of the flexible layer 310 and the correction layer 330 is 75 degrees (Rockwell hardness), and the hardness of the strength layer 320 is 80 degrees, with the raw materials of the three sub-layers and the feeding amount of the raw materials shown in Table 1:

TABLE 1

Raw materials of sub-layers and the feeding amount of the raw materials (kg) in Embodiment 1

|  | Sublayer | | |
| --- | --- | --- | --- |
| Ingredients | Flexible Layer | Strength Layer | Correction Layer |
| Calcium powder | 285.7 kg | 300 kg | 285.7 kg |
| PVC powder | 114.3 kg | 100 kg | 114.3 kg |
| Calcium-zinc stabilizer | 8 kg | 7 kg | 8 kg |
| Aids acrylic resin (ACR) | 5 kg | 5 kg | 5 kg |
| Chlorinated polyethylene | 6 kg | 4 kg | 6 kg |
| AC3A.G60-1 stearic acid | 1 kg | 1.2 kg | 1 kg |

Figure 2:
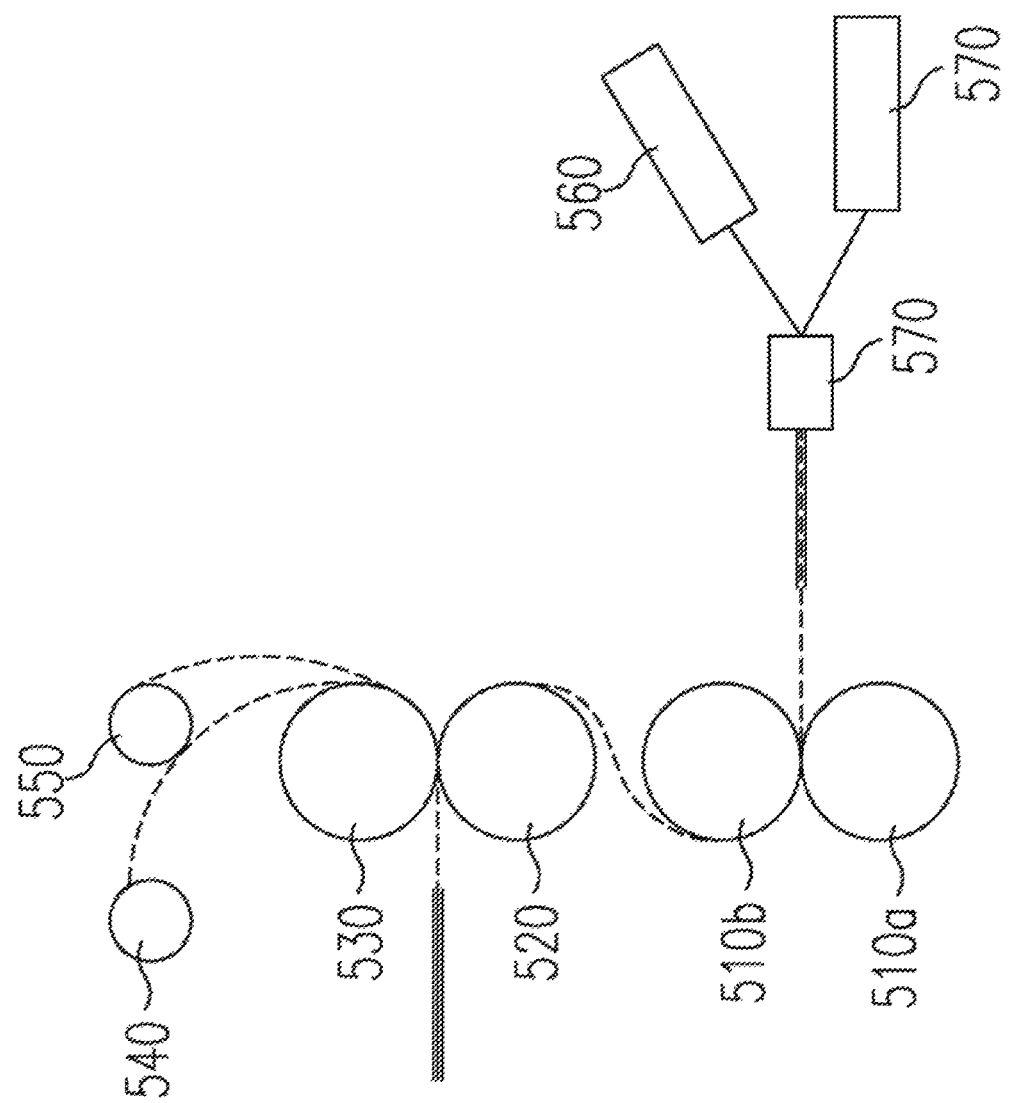
FIG. 2 is a flow chart of a method of producing the PVC flooring according to in one of the embodiments of the present invention.

In this embodiment, referring to FIG. 2, a method of producing the PVC flooring comprises the following steps of: firstly, feeding the material A into #1 extruder 560 according to the raw materials and the feeding amount in Table 1, wherein the feeding amount of all raw materials of the material A is equals to the sum of the feeding amount of the flexible layer and the correction layer; and feeding the material B into #2 extruder 570, wherein the feeding amount of all raw materials of the material B is equals to the feeding amount of the strength layer. The flexible layer 310 and the correction layer 330 with equivalent mass and thickness are simultaneously extruded from #1 extruder 560, and the strength layer 320 is extruded from #2 extruder 570. The strength layer 320 is then positioned between the flexible layer 310 and the correction layer 330 by using of a dispenser 580. The substrate layer 300 is formed through the extrusion of a pair of molds (or intermediate rollers) 510*a* and 510*b*, thereby there is no adhesive between the flexible layer 310, the strength layer 320 and the correction layer 330; a pair of molds 510*a* and 510*b* simultaneously convey the substrate layer 300 into the space between a backside pattern roller 520 and an embossing roller 530 which are designed with convex wooden patterns on their surfaces, and meanwhile a wear-resistant film transmission rack 540 and a decorative film transmission rack 550 respectively convey wear-resistant paper and decorative paper into the space between the backside pattern roller 520 and the embossing roll 530, thereby, the wear-resistant paper and the decorative paper are overlaid on the substrate under the collaboration of the backside pattern roller 520 and the embossing roller 530 so as to form the wear-resistant layer 100 and the corrective layer 200 and to form backside patterns with a concave-convex three-dimensional effect on the back surface as well as surface patterns with a concave-convex three-dimensional effect on the front surface (the side of the decorative layer 200).

Figure 3:
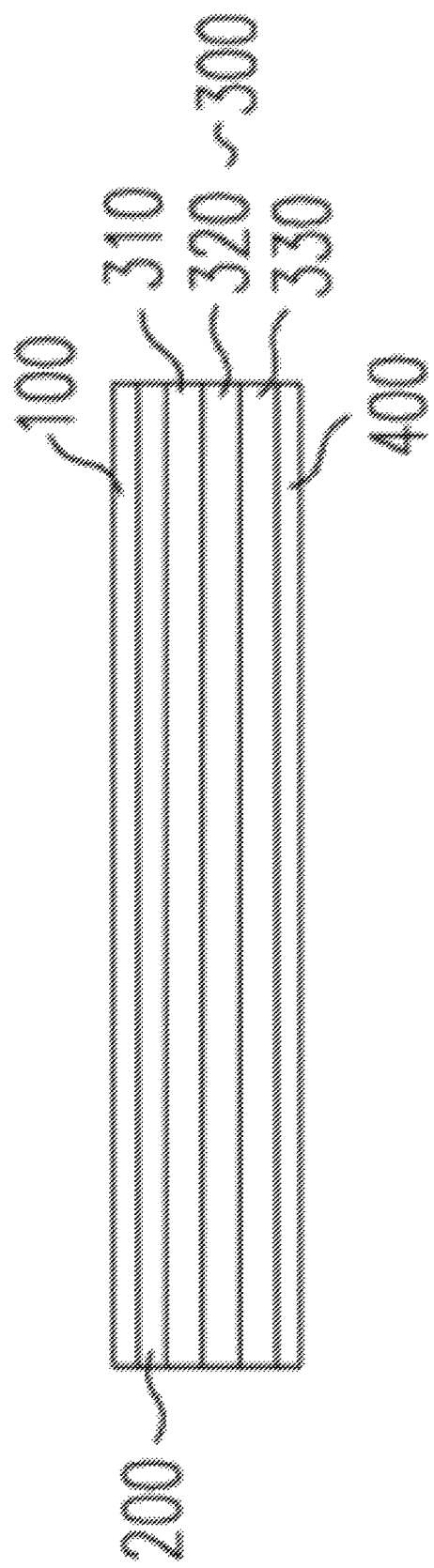
FIG. 3 is a diagram of the PVC flooring in in one of the embodiments of the present invention.

In another embodiment, referring to FIG. 3, a PVC flooring comprises a wear-resistant layer 100, a decorative layer 200, a substrate layer 300 and a mute layer 400 from top to bottom in order. The decorative layer 200 is a colored paper, the wear-resistant layer 100 is a semi-transparent PVC film, and the substrate layer 300 comprises three sub-layers, that is, a flexible layer 310, a strength layer 320 and a correction layer 330 from top to bottom in order, wherein the thickness of the flexible layer 310 is 0.5 mm, the thickness of the strength layer 320 is 1.1 mm and the thickness of the correction layer 330 is 0.5 mm; the mute layer 400 is a layer of PVC material. In this embodiment, the hardness of the flexible layer 310 and the correction layer 330 is 72 degrees (Rockwell hardness), and the hardness of the strength layer 320 is 80 degrees, with the raw materials of the three sub-layers and the feeding amount of the raw materials shown in Table 2:

TABLE 2

Raw materials of sub-layers and the feeding amount of the raw materials (kg) in Embodiment 2

| Ingredients | Sublayer | | |
| --- | --- | --- | --- |
| | Flexible Layer | Strength Layer | Correction Layer |
| Calcium powder | 267 kg | 320 kg | 267 kg |
| PVC powder | 133 kg | 80 kg | 133 k |
| Calcium-zinc stabilizer | 8.2 kg | 7.2 kg | 8.2 kg |
| Aids acrylic resin (ACR) | 5.2 kg | 5.2 kg | 5.2 kg |
| Chlorinated polyethylene | 6.2 kg | 4.2 kg | 6.2 kg |
| AC3A.G60-1 stearic acid | 1 kg | 1.2 kg | 1 kg |

In this embodiment, a method of producing the PVC flooring comprises the following steps of: firstly, feeding the material A into #1 extruder 560 according to the raw materials and the feeding amount in Table 2, wherein the feeding amount of all raw materials of the material A is equals to the sum of the feeding amount of the flexible layer and the correction layer; and feeding the material B into #2 extruder 570, wherein the feeding amount of all raw materials of the material B is equals to the feeding amount of the strength layer. The flexible layer 310 and the correction layer 330 with equivalent mass and thickness are simultaneously extruded from #1 extruder 560, and the strength layer 320 is extruded from #2 extruder 570. The strength layer 320 is then positioned between the flexible layer 310 and the correction layer 330 by using of a dispenser 580. The substrate layer 300 is formed through the extrusion of a pair of intermediate rollers 510a and 510b, thereby there is no adhesive between the flexible layer 310, the strength layer 320 and the correction layer 330; a pair of molds (or intermediate rollers) 510a and 510b simultaneously convey the substrate layer 300 into the space between the mold 510 and a backside pattern roller 520, and meanwhile, a mute film transmission rack 590 conveys a mute material into the space between the mold (or intermediate roller) 510b and the backside pattern roller 520, wherein the backside pattern roller 520 is a pattern roller, and the mute layer 400 is formed on the back surface of the substrate layer 300 under the collaboration of the intermediate roller 510b and the backside pattern roller 520; the backside pattern roller 520 conveys the substrate layer 300 overlaid with the mute layer 400 into between a backside pattern roller 520 and an embossing roller 530 which are designed with convex wooden patterns on their surfaces, and meanwhile a transmission rack 540 of the wear-resistant layer and a transmission rack 550 of the decorative layer respectively convey a wear-resistant paper and a decorative paper into between the backside pattern roller 520 and the embossing roll 530, thereby, the wear-resistant paper and the decorative paper are overlaid on the substrate under the collaboration of the backside pattern roller 520 and the embossing roller 530 so as to form the wear-resistant layer 100 and the corrective layer 200 and to form surface patterns with a concave-convex three-dimensional effect on the front surface (the side of the decorative layer 200).

In another embodiment, a PVC flooring comprises a wear-resistant layer 100, a decorative layer 200, a substrate layer 300 and a mute layer 400 from top to bottom in order. The decorative layer 200 is a wood-faced sheet, the wear-resistant layer 100 is a paint layer, and the substrate layer 300 comprises three sub-layers, that is, a flexible layer 310, a strength layer 320 and a correction layer 330 from top to bottom in order, wherein the thickness of the flexible layer 310 is 1.25 mm, the thickness of the strength layer 320 is 2.25 mm and the thickness of the correction layer 330 is 1.25 mm. In this embodiment, the hardness of the flexible layer 310 and the correction layer 330 is 76 degrees (Rockwell hardness), and the hardness of the strength layer 320 is 80 degrees, with the raw materials of the three sub-layers and the feeding amount of the raw materials shown in Table 3:

TABLE 3

Raw materials of sub-layers and the feeding amount of the raw materials (kg) in Embodiment 3

| Ingredients | Sublayer | | |
| --- | --- | --- | --- |
| | Flexible Layer | Strength Layer | Correction Layer |
| Calcium powder | 300 kg | 310 kg | 300 kg |
| PVC powder | 100 kg | 90 kg | 100 kg |
| Calcium-zinc stabilizer | 7.8 kg | 6.8 kg | 7.8 kg |
| Aids acrylic resin (ACR) | 4.8 kg | 4.8 kg | 4.8 kg |
| Chlorinated polyethylene | 5.8 kg | 3.8 kg | 5.8 kg |
| AC3A.G60-1 stearic acid | 1 kg | 1.2 kg | 1 kg |

In this embodiment, a method of producing the PVC flooring comprises the following steps of: firstly, feeding the material A into #1 extruder 560 according to the raw materials and the feeding amount in Table 2, wherein the feeding amount of all raw materials of the material A is equals to the sum of the feeding amount of the flexible layer and the correction layer; and feeding the material B into #2 extruder 570, wherein the feeding amount of all raw materials of the material B is equals the feeding amount of the strength layer. The flexible layer 310 and the correction layer 330 with equivalent mass and thickness are simultaneously extruded from #1 extruder 560, and the strength layer 320 is extruded from #2 extruder 570. The strength layer 320 is then positioned between the flexible layer 310 and the correction layer 330 by means of a dispenser 580. The substrate layer 300 is formed through the extrusion of a pair of molds (or intermediate rollers) 510a and 510b, thereby there is no adhesive between the flexible layer 310, the strength layer 320 and the correction layer 330. The substrate layer 300 is placed on a hot press after gluing, the decorative layer 200 is formed by way of hot-pressing a wooden sheet of a thickness of 2 mm, and the wear-resistant layer 100 is formed by way of roll-coating the paint upon unloading, cooling and moisturizing.

In a further embodiment, which differs from embodiments as mentioned in that the mute layer 400 is a cork layer.

In a further embodiment, additional or alternatively, an interface formed between the flexible layer 310 and the strength layer 320 and another interface formed between the strength layer 320 and the correction layer 330 are provided relative to the intermediate planes in a mirroring way; the interface comprises a first slope, a plane and a second slope which form a consecutive face, wherein a pair of the planes are arranged symmetrically, a pair of the first and second slopes are both arranged symmetrically on both sides of a pair of planes, and a pair of the first and second slopes both form a structure where they gradually expand from one side of the planes to the outer side of the substrate layer 300. The gradient between the first slope and the second slope is 1-3°.

The embodiments are only given to give instruction to the present invention, but not intended to limit the present invention. Those skilled in this art can make uncreative modifications to the embodiments according to their demands after having read the Specification. However, all such modifications are protected by the Patent Law provided they are within the scope of the Claims of the present invention.

What is claimed is:

1. A PVC flooring, comprising:
a wear-resistant layer, a decorative layer and a substrate layer from top to bottom in order; and
said substrate layer comprising a flexible layer, a strength layer and a correction layer from top to bottom in order and the hardness of the strength layer is 1.05-1.10 times that of said flexible layer and said correction layer;
each of the flexible layer, the strength layer and the correction layer comprising PVC powder and calcium powder, wherein a weight ratio of the PVC powder and the calcium powder in the flexible layer is 1:(2-3), a weight ratio of the PVC powder and the calcium powder in the strength layer is 1:(3-4) and a weight ratio of the PVC powder and the calcium powder in the correction layer is 1:(2-3).

2. The PVC flooring as claimed in claim 1, wherein the thickness ratio of said flexible layer, said strength layer and said correction layer is 1:(1.8-2.2):1.

3. The PVC flooring as claimed in claim 1, wherein there is no adhesive between said flexible layer, said strength layer and said correction layer.

4. The PVC flooring as claimed in claim 1, wherein said flexible layer comprising the following raw materials and the amount of each raw material are shown as below:
calcium powder 267-300 kg
PVC powder 100-133 kg
calcium-zinc stabilizer 7.8-8.2 kg aids acrylic resin 4.8-5.2 kg
chlorinated polyethylene 5.8-6.2 kg
AC3A.G60-1 stearic acid 1 kg;
said strength layer comprising the following raw materials and the amount of each raw material are shown as below:
calcium powder 300-320 kg
PVC powder 80-100 kg
calcium-zinc stabilizer 6.8-7.2 kg
aids acrylic resin 4.8-5.2 kg
chlorinated polyethylene 3.8-4.2 kg
AC3A.G60-1 stearic acid 1.2 kg;
said correction layer comprising the following raw materials and the amount of each raw material are shown as below:
calcium powder 267-300 kg;
PVC powder 100-133 kg;
calcium-zinc stabilizer 7.8-8.2 kg;
cids acrylic resin 4.8-5.2 kg;
chlorinated polyethylene 5.8-6.2 kg;
AC3A.G60-1 stearic acid 1 kg.

5. The PVC flooring as claimed in claim 1, wherein said decorative layer comprises a color paper, and said wear-resistant layer comprises a PVC film and/or a paint layer overlaid on the PVC film, with no adhesive used between said wear-resistant layer and said decorative layer.

6. The PVC flooring as claimed in claim 1, wherein said decorative layer comprises a wood-faced sheet or a bamboo-faced sheet, and said wear-resistant layer comprises a paint layer, and further comprising an adhesive to bond bonding these two layers together.

7. The PVC flooring as claimed in claim 1, wherein said PVC flooring further comprises a mute layer which is provided below the substrate layer, and said mute layer selected from the group consisting of a cork layer, an IXPE layer, an ethyleno vinyl acetale layer, or a PVC layer, and combinations thereof.

8. The PVC flooring as claimed in claim 5, wherein a method of producing the PVC flooring comprises the steps of: firstly, obtaining materials A and B by way of extrusion, dividing the material A into two equal portions by using of a dispenser and placing the material B between the two portions of the material A; then forming said substrate layer with materials A and B by means of hot-extruding with a pair of molds; and then using a backside pattern roller to form concave-convex backside patterns on the back surface of said substrate layer; and finally, using an embossing roller to hot-press and calender said wear-resistant layer and said corrective layer on the surface of said substrate layer and simultaneously forming concave-convex surface patterns.

9. The PVC flooring as claimed in claim 6, wherein a method of producing the PVC flooring comprises the steps of: firstly, obtaining materials A and B by way of extrusion, dividing said material A into two equal portions by using of a dispenser and placing said material B between two portions of said material A; then forming said substrate layer with said material A and B by means of hot-extruding with a pair of molds; and then applying the glue on the surface of said substrate layer and using a hot press to calender the decorative layer; and finally, roll-coating the paint to form the wear-resistant layer.

* * * * *